United States Patent [19]

Brown

[11] Patent Number: 5,662,172

[45] Date of Patent: Sep. 2, 1997

[54] AERATOR APPARTUS WITH RETRACTABLE TURF PENETRATING MEMBERS

[76] Inventor: James Brown, 7 Country Pkwy., North Providence, R.I. 02911

[21] Appl. No.: 621,874

[22] Filed: Mar. 26, 1996

[51] Int. Cl.$^6$ .......................... A01D 75/28; A01D 34/86
[52] U.S. Cl. ................................ 172/22; 56/16.7
[58] Field of Search ..................... 56/14.7, 16.7, 56/249, 255, 320.1, 322, 1, DIG. 3, DIG. 9, DIG. 10; 172/14, 15, 21, 22

[56] References Cited

U.S. PATENT DOCUMENTS

| | | | |
|---|---|---|---|
| 2,700,926 | 7/1955 | Goit | 97/216 |
| 2,730,856 | 1/1956 | Mekalainas | 56/249 |
| 3,057,411 | 10/1962 | Carlton | 172/15 |
| 3,221,822 | 12/1965 | Dedoes | 172/22 |
| 4,589,252 | 5/1986 | Williams | 56/255 |

FOREIGN PATENT DOCUMENTS 641179  8/1950  United Kingdom .

*Primary Examiner*—Terry Lee Melius
*Assistant Examiner*—Robert Pezzuto
*Attorney, Agent, or Firm*—Barlow & Barlow

[57] ABSTRACT

An aerator apparatus, having retractable penetrating blade members, for attachment to lawnmowers is shown. The aerator apparatus includes a support disc affixed to the face of a lawnmower wheel with a pivot disc pivotally connected thereto. Sandwiched between the support disc and the pivot disc are a number of blades which are pivotally mounted to the support disc. The pivot disc includes fixed tracking pins which slideably reside in slots in the support disc in the blades. When the pivot disc is rotated clockwise about the central pivot pin, the blades are urged outward into an open position via a slot and fixed pin arrangement. The pivot disc can be locked relative to the support disc to secure the position of the blades.

14 Claims, 5 Drawing Sheets

AERATOR APPARTUS WITH RETRACTABLE TURF PENETRATING MEMBERS

BACKGROUND OF THE INVENTION

The present invention relates generally to an accessory attachment for lawnmowers. More specifically, the present invention relates to a lawn aerator apparatus for aerating a lawn during the lawn mowing process.

In the field of lawnmowers, it has been well-known for a lawnmower, either a push-type or a ride-on type, to be stored in the user's garage between uses. Typically, the lawnmower is used solely for the purpose of cutting the grass of one's lawn. In addition to cutting the lawn, various other operations are done to the lawn to maintain it. For example, weed killer and fertilizer must be applied. A lawn is commonly aerated prior to seeding to maximize the results of the planting process. Typically, the lawn aeration process requires a separate step from the actual lawn mowing or cutting process. As a result, multiple passes over the same lawn is required with different pieces of equipment.

Various attempts in the prior art have been made to enable the lawn aeration process and the lawn cutting process to be carried out simultaneously. For example, U.S. Pat. No. 2,730,856, issued to Mekalainas, discloses an aerator apparatus for lawnmowers which is affixed to the outer face of the lawnmower wheels. The aerator apparatus includes a number of teeth which penetrate the ground while the lawn is being cut. The aerator attachment of Mekalainas must be completely removed from the lawnmower prior to pushing it onto a non-lawn surface, such as a driveway, to avoid damage thereto. Since this aerator attachment cannot be easily removed, the use of such an attachment is extremely cumbersome and laborious to use, particularly if it is employed on a standard power mower with four wheels.

In addition, U.S. Pat. No. 4,589,252, issued to Williams, discloses a steep terrain stabilizing device for lawnmowers which attaches to the wheels on the side of the mower facing down hill. The stabilizing devices provide a number of teeth for assisting the lawnmower in gripping the ground during lawn mowing on a steep terrain. Such stabilizing devices must be completely removed after use to avoid damage to one's driveway and the like.

To avoid having to remove the complete stabilizing device between uses, attempts have been made to provide turf penetrating members which are capable of retracting. For example, U.S. Pat. No. 2,700,926, issued to Goit, and British patent No. 641,179 disclose wheels or drums which are designed to be pushed over a lawn whereby its retractable members penetrate the lawn for aeration thereof. The members can be retracted so the wheel does not damage driveways, and the like. Due to the cumbersome nature and specialized use of the inventions disclosed in the foregoing two patents, these devices cannot be easily incorporated into a standard lawnmower to enable one to cut and aerate one's lawn at the same time.

Since there is a desire to simultaneously cut and aerate one's lawn to save time as well as avoid damage to one's non-lawn property, there is a demand for an aerator apparatus which can be easily affixed to the wheels of a lawnmower where the blades of the aerator apparatus are quickly and easily retractable to permit the user to transport the lawnmower off the lawn without incurring damage to other property.

It is also desirable to provide an apparatus which includes retractable turf penetrating members which are also adjustable to control the degree and depth of aeration to the lawn. It is also desirable that fewer moving parts be included in the aerator apparatus to reduce overall cost and manufacture and to ensure long wear-life to the apparatus.

SUMMARY OF THE INVENTION

The present invention preserves the advantages of prior art aerator apparatus for attachment to lawnmowers. In addition, it provides new advantages not found in currently available aerator apparatus, and overcomes many disadvantages of such currently available aerator apparatus.

The invention is generally directed to a novel and unique aerator apparatus for lawnmowers which is permanently affixed thereto and provides adjustable and retractable lawn penetrating members. The aerator apparatus of the present invention is simple, easy and inexpensive to assemble, use, maintain and install while providing consistent lawn aeration during the lawn cutting process.

The preferred embodiment of the present invention includes three primary members. A support disc, which has a central support disc pivot axis, is connected to a vertical outer side of the lawnmower's wheels and is adapted to rotate therewith. The support disc includes a pair of disc slots which are positioned parallel to one another and on opposing sides of the central support pivot disc axis and located proximal to an outer edge of the support disc.

A pivot disc, which has a central pivot disc pivot axis, is co-axial with the central support disc pivot axis and includes a pair of fixed pins connected on opposing sides of the central pivot disc pivot axis. The fixed pins slideably reside within the pair of support disc slots, respectively.

Further, a pair of turf penetrating members, such as blades, are sandwiched between the support disc and the pivot disc where each blade includes a pivot anchor for securing the blades to the support disc near the pair of support disc slots, respectively. Each of the blades are capable of rotating about the pivot anchor and each include a pair of blade slots. The fixed pins are slideably positioned within the support disc slots and the blade slots.

In operation, the pivot disc is rotated about its central pivot disc pivot axis relative to the support disc to cause the fixed pins to slide within the support disc slots and the blade slots simultaneously thereby forcing the blades to rotate about their pivot anchors to expose the blades for use from between the support disc and the pivot disc.

It is therefore an object of the present invention to provide an aerator apparatus for attachment to lawnmowers which permits a lawn to be cut and aerated simultaneously.

Another object of the present invention is to provide an aerator apparatus which includes turf penetrating members which are quickly and easily retracted when not in use.

It is a further object of the present invention to provide an aerator apparatus for lawnmowers that can be rendered inoperable during non-use, without complete removal from the lawnmower, to avoid damage to driveways, sidewalks, and the like.

It is yet a further object of the present invention to provide an aerator apparatus for lawnmowers which includes turf penetrating members which are adjustable to control the depth and degree of aeration.

It is another object of the present invention to provide an aerator apparatus for lawnmowers which has few moving parts for ease of manufacture and long wear life.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
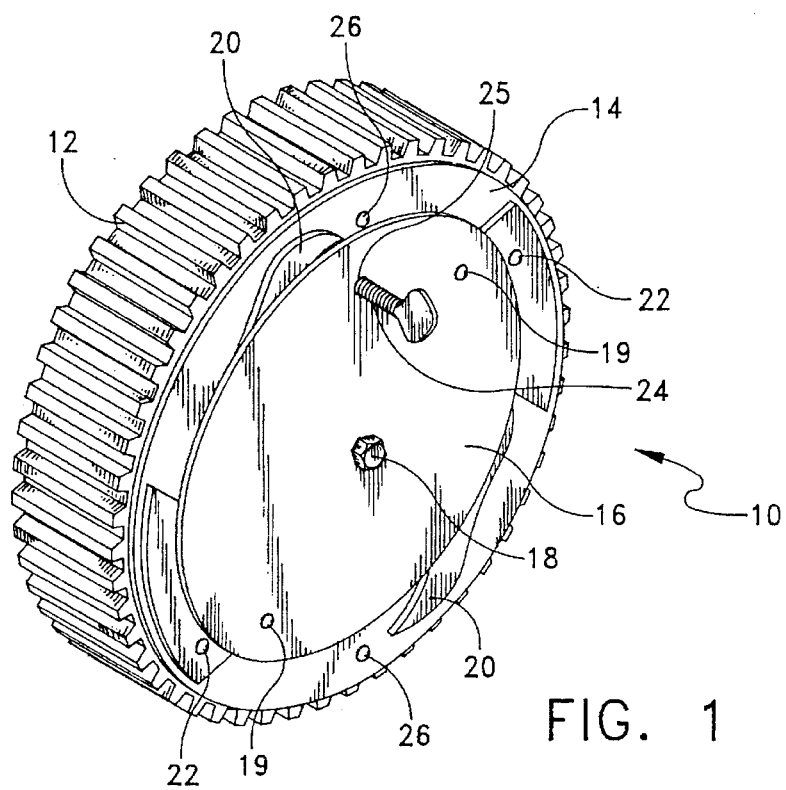
FIG. 1 is a perspective view of the preferred embodiment of the aerator apparatus of the present invention installed on a vehicle wheel.

Referring to FIG. 1, the aerator apparatus 10 of the present invention is generally shown to include a support disc 14 connected to the vertical front face of vehicle wheel 12, such as a wheel of a lawnmower, by mounting screws 26. Pivot disc 16 is connected to support disc 14 via central pivot pin 18. As a result, support disc 14 and pivot disc 16 are co-axial with each other. Fixed tracking pins 19 are connected to pivot disc 16 and emanate inwardly into the support disc. Details of the tracking of fixed tracking pins 19 will be described in detail below.

Sandwiched between support disc 14 and pivot disc 16 are a pair of turf penetrating members or blades 20 which are pivotally affixed to support disc 14 by blade pivot pins 22. In the preferred embodiment, blade pivot pins 22 also provide mounting support, in addition to mounting screws 26, for support disc 14 to wheel 12.

In addition, the preferred embodiment includes lock screw 24 through aperture 25 in pivot disc 16. Lock screw 24 is threaded through aperture 25 into communication with support disc 14 to prevent rotation of pivot disc 16 relative to support disc 14. Various other locking mechanisms may be employed to prevent pivot disc 16 rotating relative to support disc 14. In general, FIG. 1 illustrates the aerator apparatus of the present invention in a retracted closed stage which is appropriate during travel of a lawnmower or vehicle over driveways, sidewalks, and the like.

Figure 2:
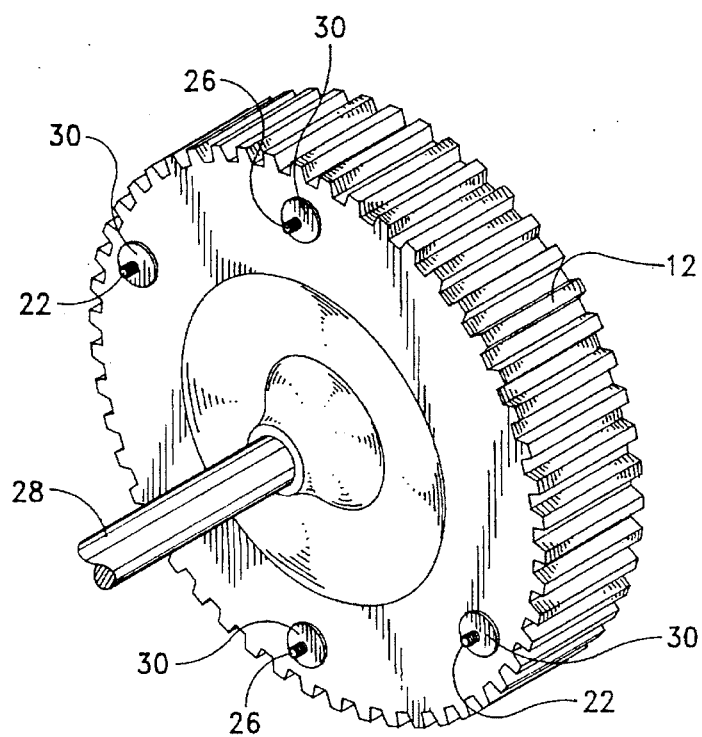
FIG. 2 is a rear perspective view of the aerator apparatus of FIG. 1 illustrating the connection of the aerator apparatus to a vehicle wheel.

Turning now to FIG. 2, a rear perspective view of the aerator apparatus for lawnmowers of the present invention is shown. As described above, support disc 14 is mounted to the front vertical face of wheel 12 by mounting screws 26. On the inner vertical face of wheel 12, wheel nuts 30 are provided to secure mounting screws 26. In addition, blade pivot pins 22 also provide mounting for support disc 14 and are secured on the inner side of the wheel 12 by wheel nuts 30. As a result, lawnmower wheel axle 28 remains unobstructed. It should be understood that various other methods, other than employing mounting screws 26 and blade pivot pins 22 as a mounting scheme, may be employed. For example, rivets may be employed or the support disc 14 may be incorporated directly into the hubcap of wheel 12.

Figure 3:
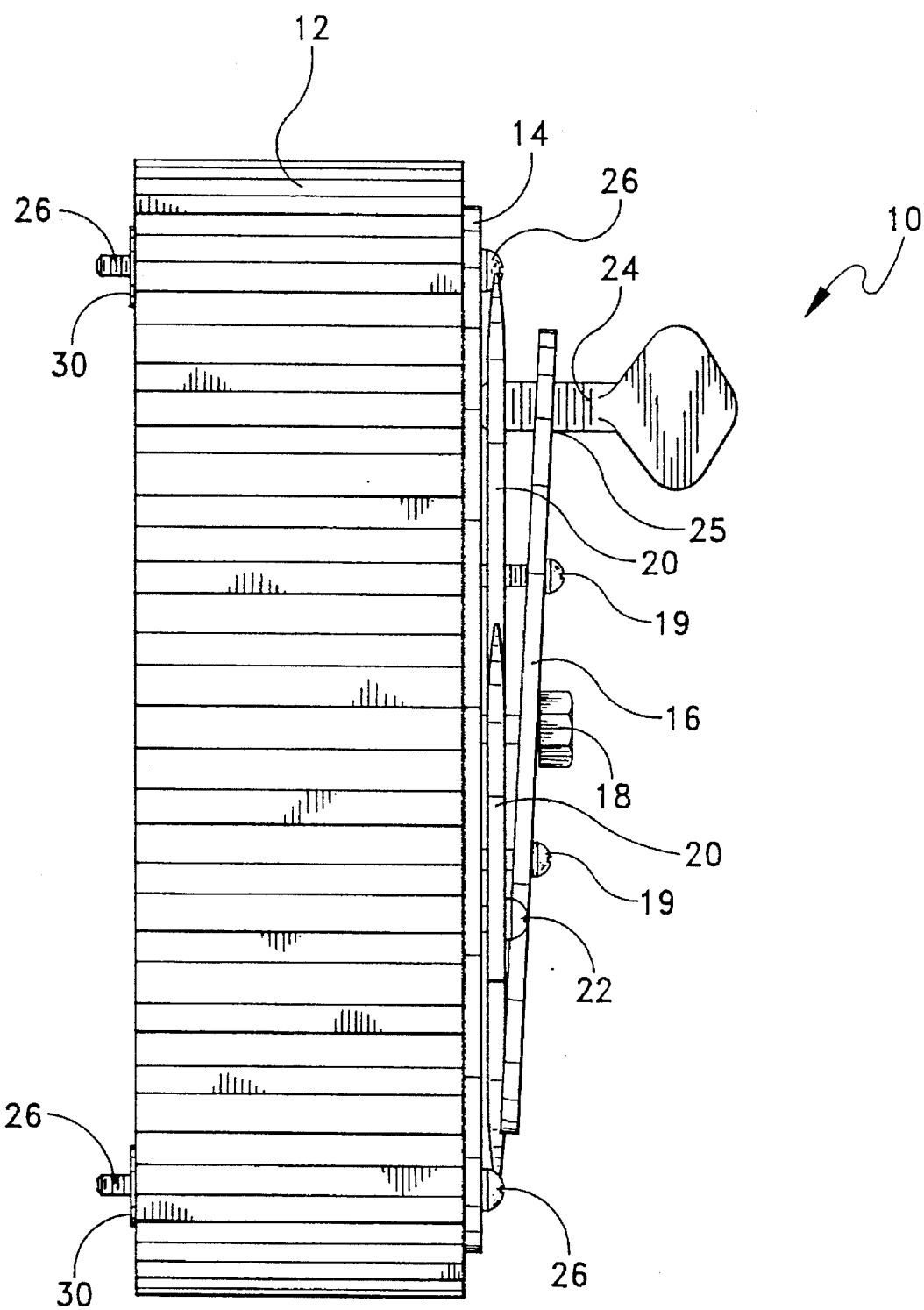
FIG. 3 is a side view of the aerator apparatus shown in FIG. 1.

A side view of the aerator apparatus for lawnmowers of the present invention is shown in FIG. 3. As can be seen, support disc 14 is mounted directly to the outer face of wheel 12. Blades 20 are sandwiched between support disc 14 and pivot disc 16 while being pivotally mounted via blade pivot pins 22. In this preferred embodiment, lock screw 24 is threaded through aperture 25 and into communication with support disc 14 to provide a rotation lock for support disc 14 and pivot disc 16.

Figure 4:
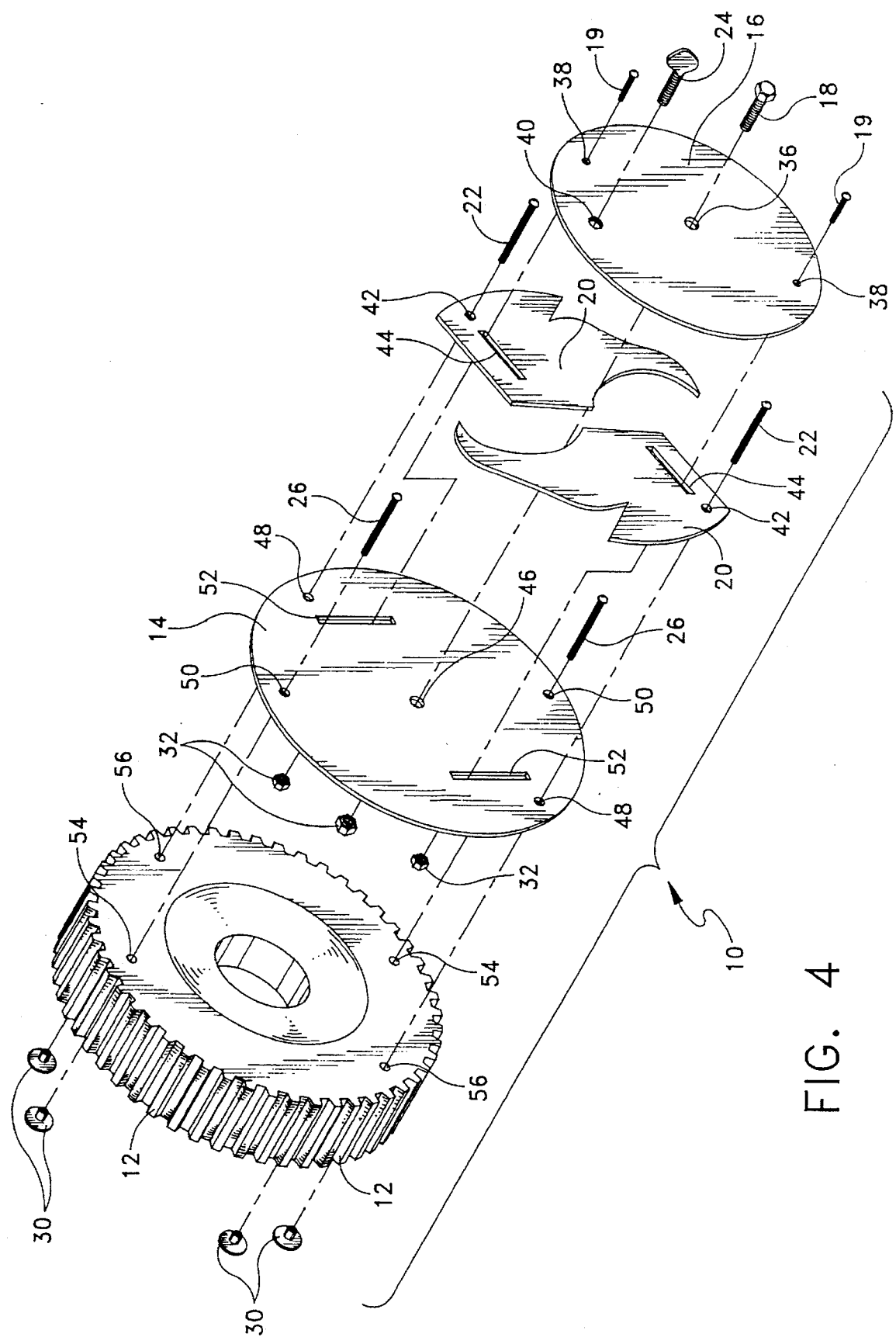
FIG. 4 is an exploded perspective view of the aerator apparatus of FIG. 1.

FIG. 4 illustrates an exploded front perspective view of the aerator apparatus 10 of the present invention installed on a lawnmower wheel 12. Support disc 14 is preferably mounted to wheel 12 via mounting screws 26 through mounting apertures 50 in support disc 14 and through wheel apertures 54 to be secured by wheel nuts 30. In addition, support disc 14 is secured to wheel 12 by blade pivot pins 22 through blade pivot pin apertures 42 in blades 20 and through mounting apertures 48 in support disc 14 and through wheel apertures 56 in wheel 12 to be secured by wheel nuts 30.

As a result, support disc 14 is secured to the front face of wheel 12 and blades 20 are pivotally secured to support disc 14 at blade pivot pin apertures 42. Pivot disc 16 is secured to support disc 14 with blades 20 sandwiched therebetween. Central pivot pin 18 is positioned through central aperture 36 in pivot disc 16 and positioned through central aperture 46 in support disc 14 to be fastened by a hex nut 32. As a result, pivot disc 16 freely pivots about the central axis through central pivot pin 18 relative to support disc 14. Pivot disc 16 includes a pair of fixed tracking pins 19 inserted through fixed tracking pin apertures 38 and pivot disc 16. Fixed tracking pins 19 are inserted, respectively, through slots 44 in blades 20 and slots 52 in support disc 14. Fixed tracking pins 19 are secured on the side of support disc 14 which faces wheel 12 by hex nuts 32. In general, fixed tracking pins 19 freely slide within slots 44 and 52. As will be described below, sliding of fixed tracking pins 19 is effectuated by rotation of pivot disc 16 relative to support disc 14.

Figure 5:
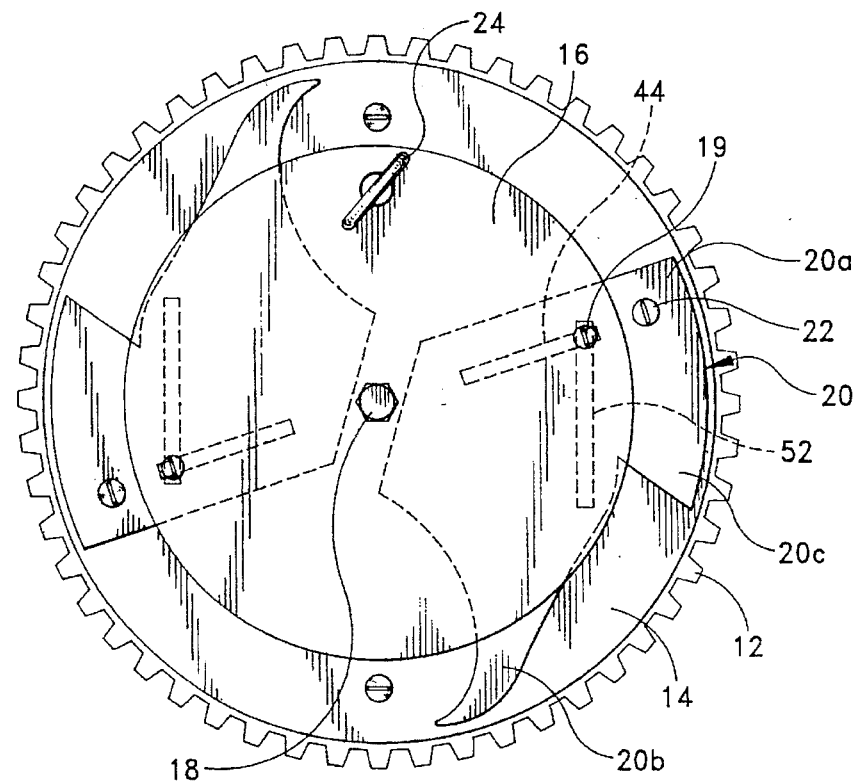
FIG. 5 is a front view of the aerator apparatus of FIG. 1 in a closed condition.
Figure 6:
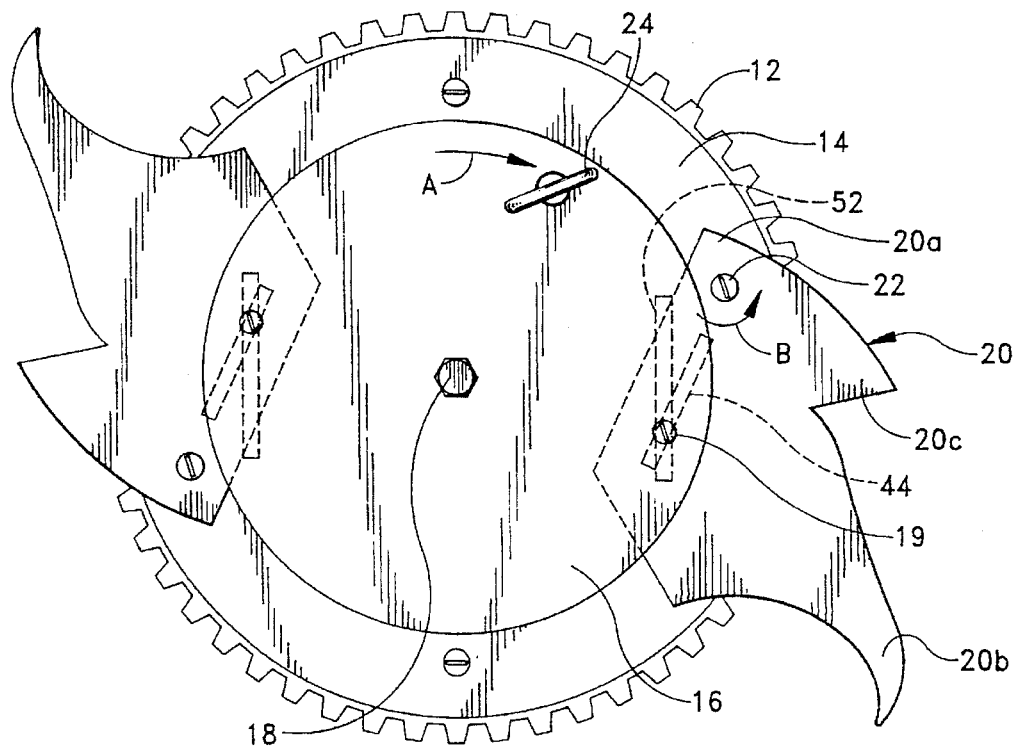
FIG. 6 is a front view of the aerator apparatus of FIG. 1 in an open condition.

FIGS. 5 and 6 illustrate operation of the aerator apparatus of the present invention; namely, the opening and closing of blades 20. Referring first to FIG. 5, a front view of the aerator apparatus of the present invention is shown as mounted on a lawnmower wheel 12. FIGS. 5 and 6 illustrate the preferred embodiment of the present invention which includes two blade members 20. It should be understood that it is possible to employ only one blade or more than two blades to carry out the invention. However, as will be described below, a pair of blades is preferred for ease of use. In addition to a lawnmower, the aerator apparatus may be installed on other vehicles, such as fertilizers and chemical spreaders. For simplicity of discussion in connection with FIGS. 5 and 6, the operation of one blade will be described in detail. It should be understood that the same details and description shall apply to the operation of the other blade member 20 on the opposing half of the aerator apparatus.

Referring generally to the right half of the aerator apparatus shown in FIG. 5, blade 20 is shown pivotally affixed to support disc 14 at blade pivot pin 22. Slot 44 and blade pivot pin 22 preferably reside in base portion 20a of blade 20. In this closed condition of FIG. 5, primary blade portion 20b and secondary blade portion 20c are retracted and within the circumference of wheel 12. As a result, no lawn penetration or aeration will occur permitting travel of the lawnmower on non-lawn surfaces. In this closed condition, fixed tracking pin 19 resides at a first end of both slots 44 and 52. Slot 44 in blade 20 is substantially perpendicular to the circumferential edge of wheel 12 while slot 52 and support disc 14 is substantially parallel to a tangent to the circumferential edge of wheel 12 which is closest to slot 52.

In this preferred embodiment, lock screw 24 is loosened or backed out to permit pivot disc 16 to rotate freely relative to support disc 14. As shown in FIG. 6, pivot disc 16 is rotated about central axis through central pivot pin 18 in a clockwise direction, referenced "A." Lock screw 24 may be employed as a handle to facilitate such pivoting. The clockwise rotation of pivot disc 16 causes fixed tracking pin 19 to travel from the top portion of slot 52 to the bottom portion of slot 52. Since fixed tracking pin 19 is also threaded through slot 44 in blade 20, fixed tracking pin 19 also travels from one end of slot 44 to another end of slot 44. Since slot 52 is in support disc 14, which is mounted to wheel 12, blade 20 must pivot about blade pivot pin 22 to permit fixed tracking pin 19 to travel within slot 44 in blade 20. As a result, the process of rotating pivot disc 16, in a clockwise direction, blade 20 pivots outward in direction, referenced "B." When blade 20 is swung out or opened to a distance satisfactory to the user, lock screw 24 is then screwed down into communication with support disc 14 to secure and prevent rotation of pivot disc 16 relative to support disc 14.

Retraction of blade 20 is accomplished by loosening or backing out lock screw 24 and then rotating pivot disc 16 counterclockwise about central pivot pin 18. The resultant structure, after retraction, is shown in FIG. 5 where lock screw 24 is again tightened down to secure blade 20 in a retracted and closed position for safety and travel.

Figure 7:
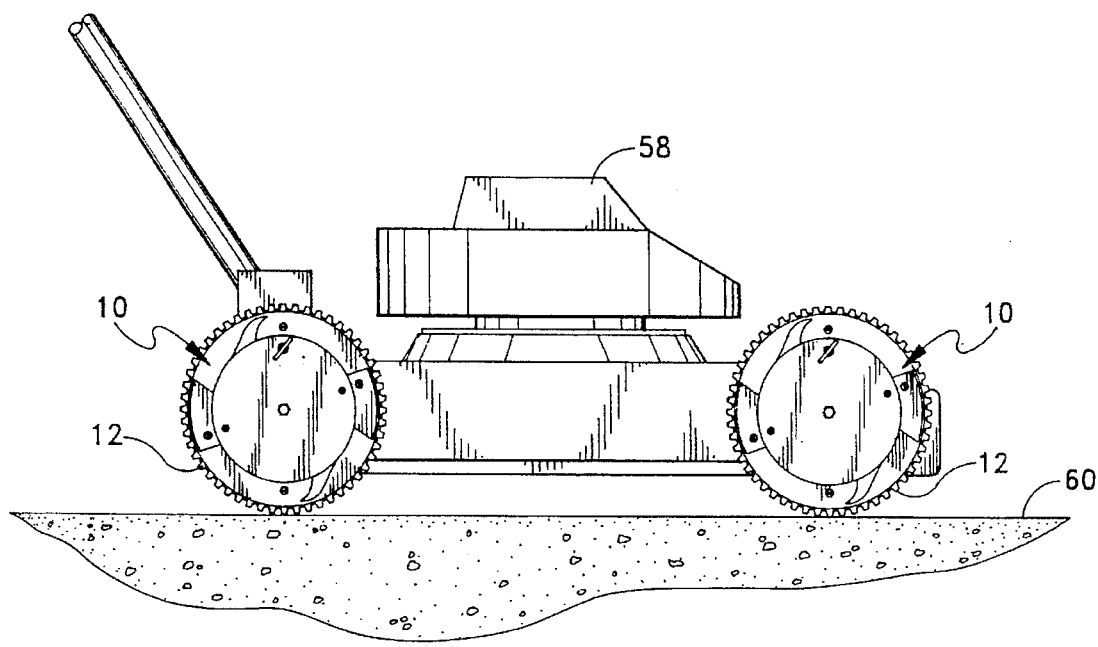
FIG. 7 is a side view of the aerator apparatus of FIG. 1 on the wheels of a lawnmower in a retracted condition.
Figure 8:
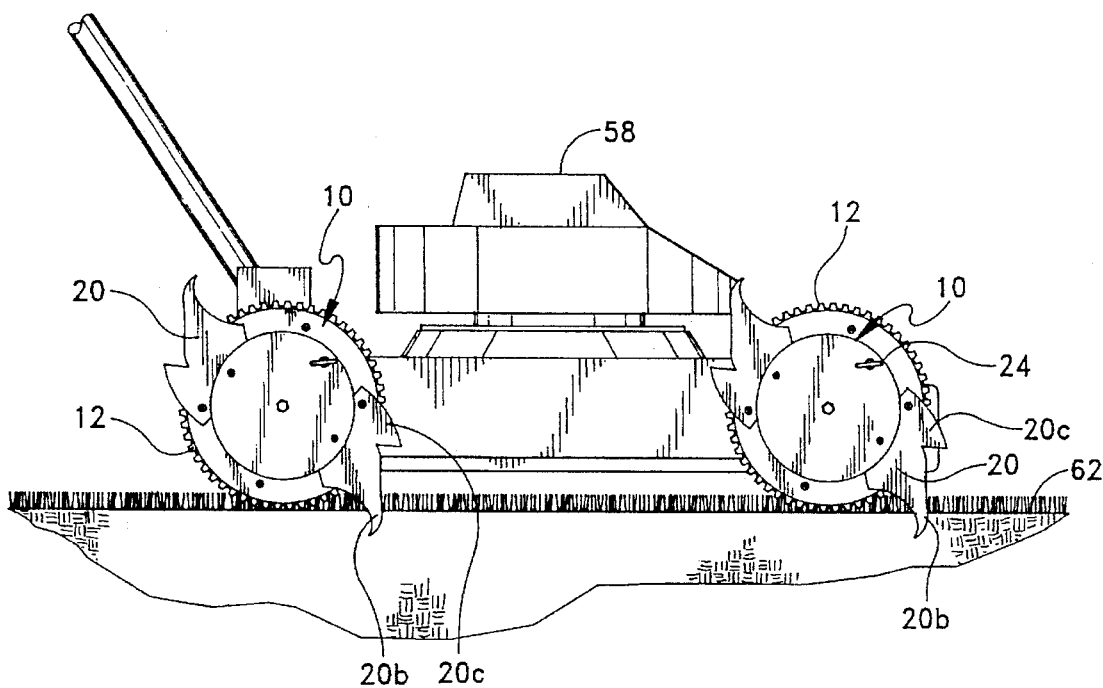
FIG. 8 is a side view of the aerator apparatus of FIG. 1 attached to the wheels of a lawnmower in an open condition for aerating a lawn.

FIGS. 7 and 8 generally show the use of the aerator apparatus of the present invention carrying out a specific job. FIG. 7 illustrates a side view of a lawnmower 58 with aerator apparatus 10 of the present invention affixed to the outer vertical faces of wheels 12. Opposing wheels of lawnmower 58 preferably carry aerator apparatus 10 as well (not shown). It should also be understood that the user may select how many aerator apparatus 10 will be used at a time and their particular location on certain wheels. Use of an aerator apparatus on all four wheels is preferred for maximum and even aeration. FIG. 7 shows aerator apparatus 10 in a closed or retracted condition. This condition is suitable for transport of lawnmower 58 over a surface 60 which is not intended to be aerated. For example, the closed or retracted condition of FIG. 7 is appropriate for transport of lawnmower 58 over driveways, sidewalks, and the like, in transit to the lawn area to be cut and aerated.

Turning now to FIG. 8, lawnmower 58, carrying aerator apparatus 10, is positioned over a surface 62 which is intended to be cut and aerated, such as a lawn. The blade members 20 can now be opened, as described above. If necessary, wheels 12 can be rotated slightly by hand to permit clearance of blades 20 when they open. After the blades are opened, the pair of blades will emanate, essentially, to the left and to the right of wheel 12. The process of opening a pair of blades on a wheel only takes a few seconds compared to several minutes in the prior art when installing an entire aeration apparatus. Once the blades are opened to a desirable position, they are locked in place by lock screw 24. As a result, as shown in FIG. 8, the lawnmower 58, with wheels 12 equipped with the aerator apparatus of the present invention, is now ready for use. Each blade 20 preferably includes a primary turf penetrating member 20b and a secondary turf penetrating member 20c. Various other blade or penetrating member shapes and sizes may be employed without departing from the scope of the invention. The preferred blade configuration provides additional turf penetration for rotation of wheel 12. As can be seen in FIG. 8, lawnmower 58 may be employed to cut a lawn 62 while simultaneously aerating lawn 62 without any degradation in lawn cutting quality.

It would be appreciated by those skilled in the art that various changes and modifications can be made to the illustrated embodiments without departing from the spirit of the present invention. All such modifications and changes are intended to be covered by the appended claims.

What is claimed is:

1. A turf penetrating apparatus for attachment to a vehicle's wheels to aerate a lawn when traversing thereover, comprising:

a support disc having a central support disc pivot axis; said support disc being connected to a vertical outer side of one of the vehicle's wheels and adapted to rotate therewith; said support disc including a pair of support disc slots positioned parallel to one another and on opposing sides of said central support disc pivot axis and located proximal to an outer edge of said support disc;

a pivot disc having a central pivot disc pivot axis being co-axial with said central support disc pivot axis; said pivot disc including a pair of fixed pins connected thereto on opposing sides of said central pivot disc pivot axis and slideably residing within said pair of support disc slots;

a pair of blades being sandwiched between said support disc and said pivot disc; said pair of blades each including a pivot anchor means for securing said blades to said support disc proximal to said pair of slots, respectively; said blades being capable of rotating about said pivot anchor means; said pair of blades each including a pair of blade slots; said fixed pins being slideably positioned within said support disc slots and said blade slots; said fixed pins being closer to said central support disc pivot axis than said pivot anchor means; said support disc slots providing a containment means for guiding said fixed pins, respectively; and whereby rotation of said pivot disc relative to said support disc causes said fixed pins to controllably slide within said support disc slots and said blade slots simultaneously thereby forcing said blades to rotate about said pivot anchor means to expose said blades for use from between said support disc and said pivot disc.

2. The turf penetrating apparatus of claim 1, further comprising:

lock means connected to said pivot disc and said support disc for preventing said support disc from rotating relative to said pivot disc.

3. The turf penetrating apparatus of claim 1, wherein said support disc, said pivot disc and said blades are manufactured of metal.

4. The turf penetrating apparatus of claim 1, wherein each of said vehicle's wheels includes said turf penetrating apparatus connected thereto.

5. The turf penetrating apparatus of claim 2, wherein said lock means is a screw threaded through a female threaded aperture in said pivot disc into communication with said support disc.

6. A turf penetrating apparatus for attachment to a lawnmower's wheels to aerate a lawn when traversing thereover, comprising:

a support disc having a central support disc pivot aperture; said support disc being connected to a vertical outer side of one of the vehicle's wheels and adapted to rotate therewith; said support disc including a pair of support disc slots positioned parallel to one another and on opposing sides of said central support disc pivot aperture and located proximal to an outer edge of said support disc; said support disc slots having a first end and a second end; said support disc including a pair of support disc pivot apertures positioned proximal to said first end of said support disc slots, respectively;

a pair of blades each including a base portion and cutting portion; each base portion including a blade pivot aperture and a blade slot; said blade slots each having a first end and a second end; said blade pivot apertures being positioned proximal to said first end of said blade slot;

fastening means positioned through said support disc pivot apertures and said blade pivot apertures, respectively for pivotally connecting said blades to said support discs while permitting rotation about said fastening means;

a pivot disc having a central pivot disc aperture and a pair of fixed pin apertures;

a pair of fixed pins connected through said pair of fixed pin apertures, said support disc slots and said blade slots, respectively, with said blades being sandwiched between said support disc and said pivot disc; said fixed pins residing at said first end of said support disc slots and at said first end of said blade slots, respectively; said fixed pins being closer to said central support disc pivot aperture than said blade pivot aperture of each said blade, respectively; said support disc slots providing a containment means for guiding said fixed pins, respectively; and whereby rotation of said pivot disc relative to said support disc causes said fixed pins to controllably slide within said support disc slots, toward the second ends of the support disc slots, and to slide within said blade slots, toward the second ends of said blade slots, simultaneously, thereby rotating said blades about said fastening means to expose said blades for use from between said support disc and said pivot disc.

7. The turf penetrating apparatus of claim 6, further comprising:

lock means connected to said pivot disc and said support disc for preventing said support disc from rotating relative to said pivot disc.

8. The turf penetrating apparatus of claim 6, wherein said support disc, said pivot disc and said blades are manufactured of metal.

9. The turf penetrating apparatus of claim 6, wherein each of said vehicle's wheels includes said turf penetrating apparatus connected thereto.

10. The turf penetrating apparatus of claim 7, wherein said lock means is a screw threaded through a female threaded aperture in said pivot disc into communication with said support disc.

11. A retractable blade cutting apparatus, comprising:

a support disc having a central support disc pivot aperture; said support disc including a pair of support disc slots positioned parallel to one another and on opposing sides of said central support disc pivot aperture and located proximal to an outer edge of said support disc; said support disc slots having a first end and a second end; said support disc including a pair of support disc pivot apertures positioned proximal to said first end of said support disc slots, respectively;

a pair of blades each including a base portion and cutting portion; each base portion including a blade pivot aperture and a blade slot; said blade slots each having a first end and a second end; said blade pivot apertures being positioned proximal to said first end of said blade slot;

fastening means positioned through said support disc pivot apertures and said blade pivot apertures, respectively for pivotally connecting said blades to said support discs while permitting rotation about said fastening means;

a pivot disc having a central pivot disc aperture and a pair of fixed pin apertures;

a pair of fixed pins connected through said pair of fixed pin apertures, said support disc slots and said blade slots, respectively, with said blades being sandwiched between said support disc and said pivot disc; said fixed pins residing at said first end of said support disc slots and at said first end of said blade slots, respectively; said fixed pins being closer to said central support disc pivot aperture than said blade pivot aperture of each said blade, respectively; said support disc slots providing a containment means for guiding said fixed pins, respectively; and whereby rotation of said pivot disc relative to said support disc causes said fixed pins to controllably slide within said support disc slots, toward the second ends of the support disc slots, and to slide within said blade slots, toward the second ends of said blade slots, simultaneously, thereby rotating said blades about said fastening means to expose said blades for use from between said support disc and said pivot disc.

12. The retractable blade cutting apparatus of claim 11, further comprising:

lock means connected to said pivot disc and said support disc for preventing said support disc from rotating relative to said pivot disc.

13. The retractable blade cutting apparatus of claim 11, wherein said support disc, said pivot disc and said blades are manufactured of metal.

14. The retractable blade cutting apparatus of claim 12, wherein said lock means is a screw threaded through a female threaded aperture in said pivot disc into communication with said support disc.

* * * * *